(12) United States Patent
Steiner

(10) Patent No.: US 9,622,618 B2
(45) Date of Patent: Apr. 18, 2017

(54) COFFEE GRINDER, IN PARTICULAR FOR AN AUTOMATIC COFFEE MACHINE

(71) Applicant: STEINER AG WEGGIS, Weggis (CH)

(72) Inventor: Adrian Steiner, Weggis (CH)

(73) Assignee: Steiner AG Weggis, Weggis (CH)

( * ) Notice: Subject to any disclaimer, the term of this patent is extended or adjusted under 35 U.S.C. 154(b) by 393 days.

(21) Appl. No.: 14/294,228

(22) Filed: Jun. 3, 2014

(65) Prior Publication Data

US 2014/0361107 A1 Dec. 11, 2014

(30) Foreign Application Priority Data

Jun. 6, 2013 (CH) .................................. 1078/13

(51) Int. Cl.
*A47J 42/00* (2006.01)
*A47J 42/18* (2006.01)
*A47J 31/42* (2006.01)

(52) U.S. Cl.
CPC .............. *A47J 42/18* (2013.01); *A47J 31/42* (2013.01)

(58) Field of Classification Search
CPC ................. A47J 7/14; A47J 7/12; A47J 31/42
See application file for complete search history.

(56) References Cited

U.S. PATENT DOCUMENTS

| | | | |
|---|---|---|---|
| 2,560,826 A * | 7/1951 | Schuhmann ............ | A47J 42/50 222/308 |
| 2,852,203 A * | 9/1958 | Ditting .................... | A47J 42/18 241/259 |
| 4,681,028 A | 7/1987 | Schmed et al. | |
| 4,892,031 A | 1/1990 | Webster et al. | |
| 5,367,947 A | 11/1994 | Lussi et al. | |
| 5,957,033 A | 9/1999 | In-Albon | |
| 6,298,769 B1 | 10/2001 | Stettes et al. | |
| 7,017,474 B2 | 3/2006 | Comte | |
| 7,472,641 B2 | 1/2009 | Doglioni Majer | |
| 8,146,485 B2 | 4/2012 | Ozanne et al. | |
| 8,479,643 B2 | 7/2013 | Aemisegger et al. | |
| 2004/0200912 A1 * | 10/2004 | Park ....................... | A47J 42/16 241/37 |
| 2010/0170971 A1 * | 7/2010 | Doglioni Majer ...... | A47J 42/38 241/30 |
| 2011/0256289 A1 | 10/2011 | Steiner | |
| 2012/0138721 A1 * | 6/2012 | Hergesell ............... | A47J 42/18 241/277 |
| 2012/0228418 A1 * | 9/2012 | Mazzer ................... | A47J 42/18 241/290 |
| 2013/0095219 A1 * | 4/2013 | de Graaff ............... | A47J 31/42 426/433 |
| 2014/0116475 A1 | 5/2014 | Steiner | |

* cited by examiner

*Primary Examiner* — Faye Francis
(74) *Attorney, Agent, or Firm* — Brian Roffe

(57) ABSTRACT

Coffee grinder includes two grinding discs that can be rotated in opposite directions, the axial distance between which defines the degree of grinding of the coffee powder produced. The grinding discs are mounted one over the other within a grinder body, the lower grinding disc being rotatable about a vertical axis of rotation while the upper grinding disc can be adjusted non-rotatably and by an eccentric shaft relative to the lower grinding disc in the direction of the vertical axis of rotation. By rotating the eccentric shaft with a motorized drive, the space between the grinding discs can be changed. This enables almost infinite regulation of the degree of grinding when preparing the coffee.

20 Claims, 2 Drawing Sheets

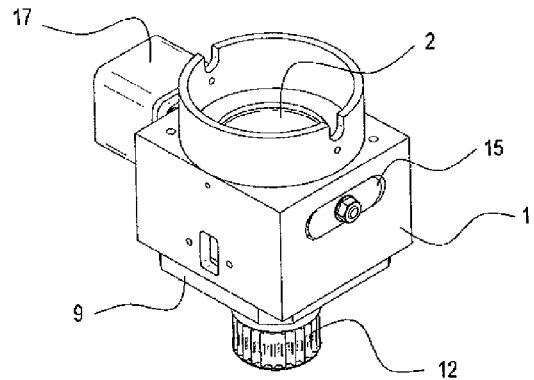
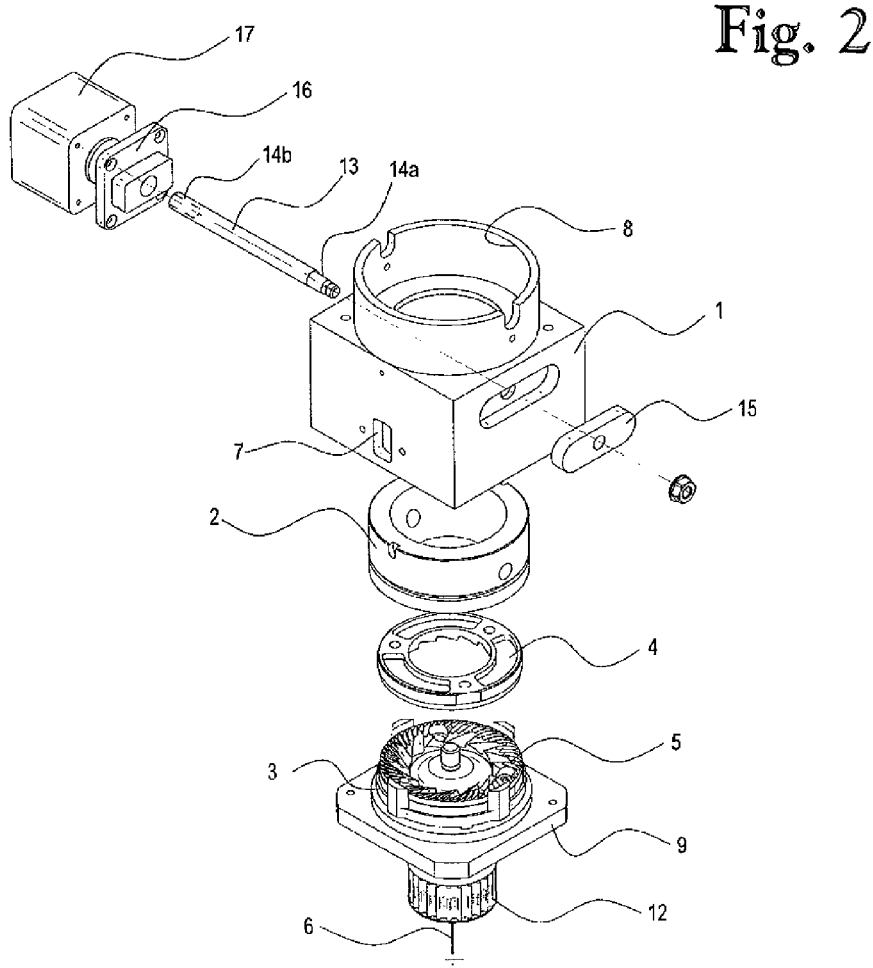

COFFEE GRINDER, IN PARTICULAR FOR AN AUTOMATIC COFFEE MACHINE

FIELD OF THE INVENTION

The invention relates to a coffee grinder, in particular for an automatic coffee machine, comprising two grinding discs that can be rotated in opposite directions, the axial distance between which defines the degree of grinding of the coffee powder to be produced.

BACKGROUND OF THE INVENTION

In an automatic coffee machine according to publication EP 0 761 150, corresponding to U.S. Pat. No. 5,957,033, a coffee grinder integrated into the coffee machine makes it possible to prepare coffee with coffee powder that is always freshly ground. This coffee grinder is equipped with two grinding discs that can be rotated in opposite directions in the conventional manner. In order to vary the degree of grinding which defines the grain size of the ground material as required, there is provided in the carrier of the one grinding disc a thread that can be screwed in and out within the body of the grinder, the effect of which is that the distance between the grinding discs can be adjusted by rotating the carrier manually. It is not possible to set the degree of grinding accurately and to keep it constant with these coffee grinders. Moreover, the manual handling is disadvantageous.

OBJECTS AND SUMMARY OF THE INVENTION

The object underlying the invention is to avoid these disadvantages and to devise a coffee grinder of the type specified at the start which guarantees the most constant possible quality of the prepared coffee with structurally simple means.

This object is achieved according to the invention in that the coffee grinder is provided with a preferably motor-driven eccentric shaft as an actuator for axially adjusting the grinding disc relative to the other grinding disc.

In this way it is possible, by rotating the eccentric shaft, to continuously regulate the degree of grinding of the coffee grinder so that the quality of the coffee produced remains constant.

According to the invention the coffee grinder is designed such that the two grinding discs are mounted one over the other within a grinder body, the lower grinding disc being rotatable about a vertical axis of rotation, while the upper grinding disc can be adjusted non-rotatably and by the eccentric shaft relative to the lower grinding disc in the direction of the axis of rotation. It is advantageous here if the non-rotatable grinding disc is disposed in a grinding disc carrier that can be shifted axially within the grinder body and the eccentric shaft is guided horizontally by the grinding disc carrier. In this way it is ensured that the grinding disc carrier is moved by the eccentric shaft vertically upwards and downwards. In order to enable this moveability it is advantageous to provide the eccentric shaft on both sides with axially cylindrical shaft parts which are guided within corresponding bore holes of the grinder body.

By means of the described design it is possible to dispose the drive of the eccentric shaft on both sides of the eccentric shaft so that only one basic version of the grinder body is required for both possible arrangements.

It is also advantageous within the context of precise control of the eccentric shaft involving simple apparatus if the latter can be driven with an electric drive, preferably an electric motor. Instead of the electric motor, other similar drives with sensitive control could also be used.

In any case, it is advantageous here if the drive of the eccentric shaft is provided with a holding torque that prevents undesired adjustment of the grinder.

The invention also makes provision for the possibility of integrating the eccentric shaft drive into a closed regulating system of the coffee machine. In this way the eccentric shaft can be controlled largely independently of operator intervention, for example according to a previously inputted programme. It is thus possible in this way, for example, to set the optimal degree of grinding for each coffee type automatically and either to keep it constant during the grinding process or to vary it as desired and required.

According to the invention the geometry of the eccentric shaft is chosen such that its profile takes into account the desired degree of accuracy for adjusting the grinder and the holding torque of the drive and the bearing pressure for the adjustable grinding disc carrier.

The coffee grinder according to the invention has a compact structure and can be assembled and disassembled easily, for example in order to clean or service the machine. It can easily be fitted subsequently in existing coffee machines or even be used as an autonomous individual device.

BRIEF DESCRIPTION OF THE DRAWINGS

In the following the invention is described in more detail by means of an exemplary embodiment with reference to the drawings. These show as follows:

FIG. 1 a coffee grinder according to the invention, shown perspectively,

FIG. 2 the coffee grinder according to FIG. 1, shown in an exploded view,

DETAILED DESCRIPTION OF THE INVENTION

Figure 3:
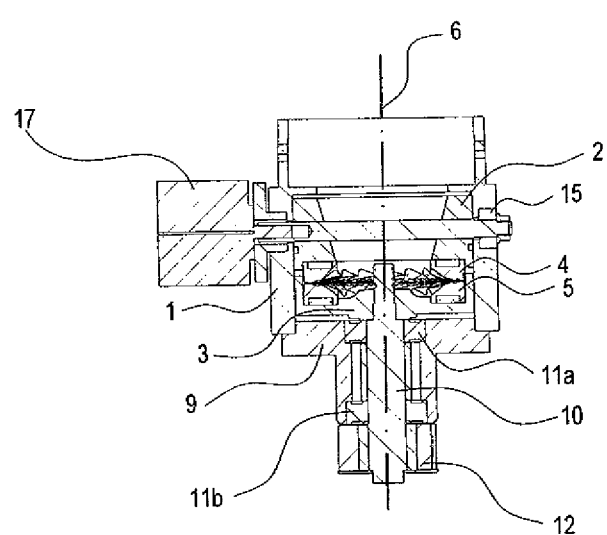
FIG. 3 a longitudinal section of the coffee grinder according to FIG. 1.
Figure 4:
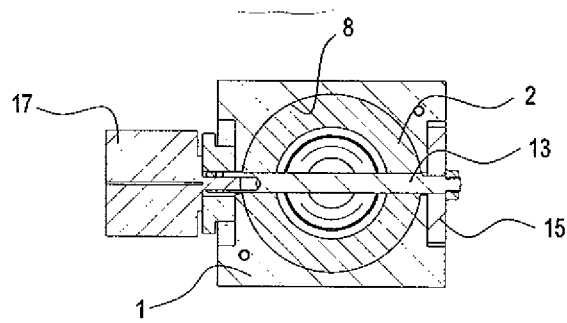
FIG. 4 a cross-section of the coffee grinder.

The coffee grinder according to FIGS. 1, 2, 3 and 4 consists of a grinder body 1 and grinding disc carriers 2, 3 with grinding discs 4 and 5 lying one over the other, the lower grinding disc (5 as shown in FIGS. 2 and 3) of which can be rotated about a vertical axis of rotation 6, while the upper grinding disc 4 (as shown in FIGS. 2 and 3) is arranged non-rotatably. The grinding disc carrier 2 of the upper grinding disc 4 has on the inside, a slightly conical cross-section. This facilitates the introduction of coffee beans into the region between the grinding discs 4 and 5.

The grinder body 1 is provided with a coffee powder channel 7 and has a hollow cylindrical interior 8 in which the two grinding disc carriers 2, 3 with the grinding discs 4, 5 are mounted. At the bottom this grinder body 1 is completed by a base 9 through which the drive shaft 10 of the lower grinding disc 5 is guided. The drive shaft 10 is mounted in a set of bearings 11a, 11b and can be driven with a drive 12.

During assembly the one grinding disc carrier 3 with the grinding disc 5 is screwed securely onto the drive shaft 10 mounted in the base 9. The other grinding disc carrier 2, however, is held together with the grinding disc 4 in the grinder body 1 by means of this eccentric shaft 13 secured by a securing element (not detailed). This facilitates cleaning of the coffee grinder. In this way the maintenance time and the interruption in operation required for this can be reduced.

According to the invention, the coffee grinder according to FIGS. 1, 2, 3 and 4 is equipped with an eccentric shaft 13 guided horizontally through the upper grinding disc carrier 2 and with which the upper grinding disc 4 can be adjusted relative to the lower grinding disc 5 in the direction of the vertical axis of rotation 6. This arrangement makes it possible to divide up the movement caused by the eccentric shaft 13. The upper grinding disc carrier 2 only moves in the vertical direction. It is moved here upwards and downwards by the eccentric shaft 13 with practically no play. On the one hand, the horizontal movement takes on the mounting of the drive and on the other hand, the closure plate (also referred to and functioning as a shaft support) 15 on the opposite side of the drive.

The eccentric shaft 13 has on both sides axially cylindrical shaft sections 14a, 14b which can be rotated within corresponding bore holes of the grinder body 1 or a closure plate 15, 16 fitted within the latter. It can be driven by an electric motor 17.

Due to the described structure it is possible to fasten the electric motor 17 to both sides of the grinder body 1. Thus, the structure according to the invention makes possible with just one basic design of the grinder body a number of different arrangements of the drive, for example adapted to the spatial or technical circumstances.

Instead of the electric motor 17, a different, preferably electrical, drive could of course also be used in so far as it also brings about a likewise infinite, sensitive rotational movement of the eccentric shaft. In principle, however, a device with manual adjustment could also be provided instead of a drive motor.

For the purpose of automated operation, it is possible to integrate the drive into a closed regulating system of the coffee machine. In this way, the device can work largely independently of an operator, for example according to a preset program according to the type of coffee used, the desired degree of grinding and similar parameters which are essential for the quality of the coffee produced.

The described coffee grinder can also be fitted subsequently in existing coffee machines. It can also be used as an autonomous individual device, for example as a kitchen utensil.

Needless to say, the invention could also be realized by other variations. Thus, a cam disc, a nut/bolt connection or the like could also be provided instead of an eccentric adjustment as an actuator for the grinding disc. The two grinding discs could also be rotated relative to one another when grinding.

The coffee grinder could also be arranged horizontally with a horizontal axis of rotation of the grinding disc.

The invention claimed is:

1. A coffee grinder, comprising:
    two grinding discs that can be rotated in opposite directions, an axial distance between the two grinding discs defining a degree of grinding of coffee powder produced upon grinding of coffee, and
    an actuator for axially adjusting a first one of the two grinding discs relative to a second one of the two grinding discs, the actuator comprising:
        an eccentric shaft that rotates and causes upon rotation, the first grinding disc to be moved axially relative to the second grinding disc to provide different axial distances between the first and second grinding discs, and
        an electric drive coupled to the eccentric shaft and configured to selectively rotate the eccentric shaft, the actuator being configured to provide a holding torque that prevents rotation of the eccentric shaft to thereby prevent axial movement of the first grinding disc relative to the second grinding disc.

2. The coffee grinder according to claim 1, further comprising a grinder body, the first and second grinding discs being mounted one over the other within the grinder body such that the first grinding disc is an upper grinding disc and the second grinding disc is a lower grinding disc, the lower grinding disc being rotatable about an axis of rotation and the upper grinding disc being non-rotatable and adjustable upon rotation of the eccentric shaft relative to the lower grinding disc in the direction of the axis of rotation.

3. The coffee grinder according to claim 2, further comprising a first grinding disc carrier, the first grinding disc being situated in connection with the first grinding disc carrier, the first grinding disc carrier being configured to enable the first grinding disc to move axially within the grinder body.

4. The coffee grinder according to claim 3, wherein the axis of rotation is a vertical axis of rotation and the eccentric shaft is in a horizontal configuration, the eccentric shaft extending through the first grinding disc carrier and being retained at end regions by the first grinding disc carrier such that the first grinding disc carrier is configured to guide the eccentric shaft horizontally.

5. The coffee grinder according to claim 4, wherein the first grinding disc carrier is only movable in the vertical direction.

6. The coffee grinder according to claim 2, wherein the eccentric shaft is elongate and includes axially cylindrical shaft parts on both ends, the grinder body including bore holes on opposite sides, each of the shaft parts of the eccentric shaft being retained and rotatable in a respective one of the bore holes of the grinder body to thereby enable the grinder body to guide rotation of the eccentric shaft.

7. The coffee grinder according to claim 2, further comprising closure plates fitted in the grinder body and including holes, each of the shaft parts of the eccentric shaft being retained and rotatable in the hole of a respective one of the closure plates to thereby enable the closure plates to guide rotation of the eccentric shaft.

8. The coffee grinder according to claim 2, further comprising a first grinding disc carrier and a second grinding disc carrier, the first grinding disc being arranged in connection with the first grinding disc carrier and the second grinding disc being arranged in connection with the second grinding disc carrier, and wherein the grinder body includes a coffee powder channel through which coffee powder passes and a hollow cylindrical interior in which the first and second grinding disc carriers are situated.

9. The coffee grinder according to claim 1, wherein the electric drive comprises a motor.

10. The coffee grinder according to claim 1, further comprising a grinder body, the first and second grinding discs being mounted within the grinder body, and wherein the actuator is configured to provide the holding torque to prevent movement of the grinder body.

11. The coffee grinder according to claim 1, wherein the electric drive is integrated into a regulating system that enables programming of the electric drive and thus automatic movement of the first grinding disc relative to the second grinding disc.

12. The coffee grinder according to claim 1, further comprising a grinder body, the first and second grinding discs being mounted within the grinder body, and wherein the actuator is attached to opposite sides of the grinder body.

13. The coffee grinder according to claim 1, further comprising a first grinding disc carrier, the first grinding disc being situated in the first grinding disc carrier, the first grinding disc carrier being configured to enable the first grinding disc to be moved axially, and wherein the eccentric shaft has a geometric shape configured to provide a predefined degree of grinder adjustment, a predefined amount of holding torque of the electric drive and a predefined bearing pressure for the first grinding disc carrier.

14. A coffee machine including the coffee grinder according to claim 1.

15. The coffee grinder according to claim 1, further comprising a grinder body, the first grinding disc being mounted non-rotatably within the grinder body and the second grinding disc being rotatably mounted within the grinder body such that the second grinding disc rotates relative to the first grinding disc.

16. The coffee grinder according to claim 1, wherein the second grinding disc is rotatable about an axis of rotation and the first grinding disc is non-rotatable about the axis of rotation and adjustable upon rotation of the eccentric shaft relative to the second grinding disc in the direction of the axis of rotation.

17. The coffee grinder according to claim 16, further comprising a first grinding disc carrier and a second grinding disc carrier, the first grinding disc being arranged in connection with the first grinding disc carrier and the second grinding disc being arranged in connection with the second grinding disc carrier, the first grinding disc carrier being movable in an axial direction toward and away from the second grinding disc carrier.

18. The coffee grinder according to claim 1, further comprising a grinder body, the first and second grinding discs being mounted within the grinder body, and wherein the eccentric shaft is elongate and includes axially cylindrical shaft parts on both ends, the grinder body including bore holes on opposite sides, each of the shaft parts of the eccentric shaft being retained and rotatable in a respective one of the bore holes of the grinder body to thereby enable the grinder body to guide rotation of the eccentric shaft.

19. The coffee grinder according to claim 1, further comprising:
   a grinder body, the first and second grinding discs being arranged within the grinder body, the second grinding disc being rotatable about an axis of rotation and the first grinding disc being non-rotatable and adjustable upon rotation of the eccentric shaft relative to the second grinding disc in the direction of the axis of rotation; and
   a first grinding disc carrier, the first grinding disc being situated in connection with the first grinding disc carrier, the eccentric shaft holding the first grinding disc carrier and the first grinding disc together in the grinder body.

20. The coffee grinder according to claim 19, wherein the eccentric shaft is elongate and includes axially cylindrical shaft parts on both ends, the grinder body including bore holes on opposite sides, each of the shaft parts of the eccentric shaft being retained and rotatable in a respective one of the bore holes of the grinder body to thereby enable the grinder body to guide rotation of the eccentric shaft.

* * * * *